US006883445B2

(12) United States Patent
Mayerle

(10) Patent No.: US 6,883,445 B2
(45) Date of Patent: Apr. 26, 2005

(54) DUAL CONFIGURABLE DISTRIBUTION NURSE SYSTEM

(75) Inventor: Dean Mayerle, Saskatoon (CA)

(73) Assignee: CNH Canada, Ltd., Racine, WI (US)

(*) Notice: Subject to any disclaimer, the term of this patent is extended or adjusted under 35 U.S.C. 154(b) by 0 days.

(21) Appl. No.: 10/409,664

(22) Filed: Apr. 8, 2003

(65) Prior Publication Data

US 2004/0206283 A1 Oct. 21, 2004

(51) Int. Cl.[7] .................................................. A01C 7/00
(52) U.S. Cl. ...................................................... 111/175
(58) Field of Search ................................ 111/170, 174, 111/175, 176

(56) References Cited

U.S. PATENT DOCUMENTS

| | | | | |
|---|---|---|---|---|
| 4,872,785 A | * 10/1989 | Schrage et al. | ............. | 406/155 |
| 5,074,228 A | * 12/1991 | Daws | ......................... | 111/175 |
| 5,265,547 A | * 11/1993 | Daws | ......................... | 111/175 |
| 6,182,699 B1 | * 2/2001 | Hawkes | ...................... | 137/875 |
| 6,267,067 B1 | * 7/2001 | Mayerle et al. | ............. | 111/170 |
| 6,298,797 B1 | * 10/2001 | Mayerle et al. | ............. | 111/175 |
| 6,581,532 B1 | * 6/2003 | Hagen et al. | ............... | 111/170 |
| 6,644,225 B1 | * 11/2003 | Keaton | ........................ | 111/175 |
| 6,688,244 B1 | * 2/2004 | Meyer et al. | ............... | 111/174 |

* cited by examiner

*Primary Examiner*—Robert E. Pezzuto
*Assistant Examiner*—Nathan S Mammen
(74) *Attorney, Agent, or Firm*—Rebecca Henkel; Brant T. Maurer

(57) ABSTRACT

A nurse receiver header for an agricultural planting implement is cooperable with a nurse mechanism that conveys seeds entrained in an air stream from a central hopper. A receiver is positioned at the planting mechanism to receive the seeds entrained in the air stream and accumulate a supply of seeds for utilization by the associated planting mechanism. The receiver header includes a plurality of legs and a rotatable baffle positioned internally at an uppermost position of at least one leg of the receiver header. The baffle is pivoted by an external lever that is positioned in the same orientation as the baffle to indicate the position of the baffle. The header can be placed in a closed configuration by positioning the baffle across the leg to be blocked. When in an open configuration, the baffle is positioned parallel to the leg and all of the legs of the header are open.

22 Claims, 19 Drawing Sheets

Fig. 17
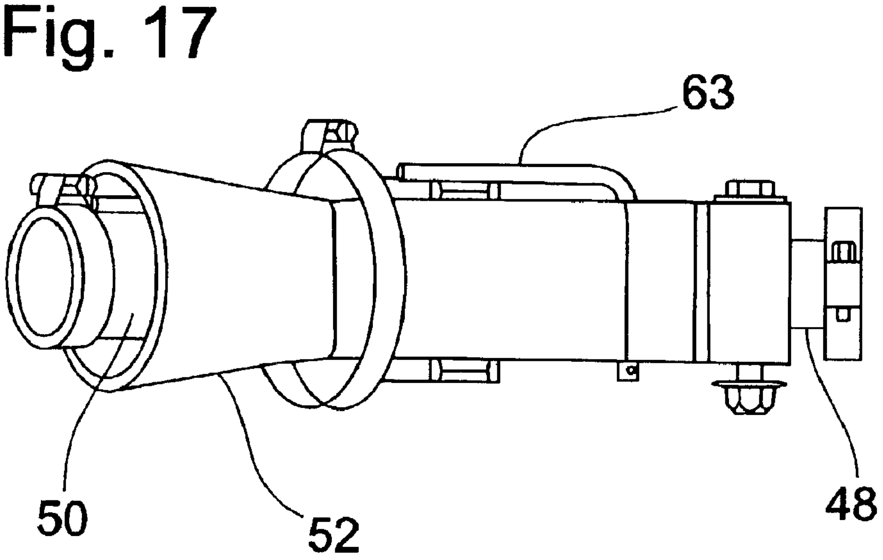
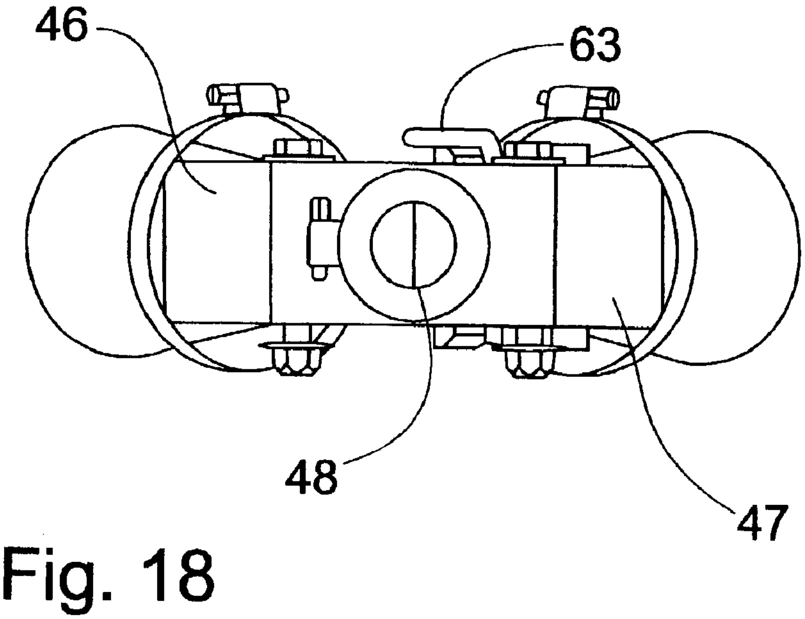
Fig. 18

DUAL CONFIGURABLE DISTRIBUTION NURSE SYSTEM

FIELD OF THE INVENTION

The present invention relates generally to planters or air seeders for planting seeds in the ground in an agricultural environment. In particular, the present invention relates to a nurse inductor system co-operable with a planter mechanism to feed seed or other particulate material to a planting mechanism for insertion of that material into the ground.

BACKGROUND OF THE INVENTION

As the size of agricultural implements continues to grow, the versatility of such implements becomes more significant. Large air seeders have become increasingly popular for the planting of seeds, fertilizer, and other product without strict regard for the exact placement of the seeds particles. For crop planting operations that require seed singulation, nurse systems are used to feed seed or other particles from larger hoppers into smaller reservoirs located at the singulation meters. A nurse inductor system enables an air cart typically used for dryland farming (cereal crops, etc.), to be adapted for use in row crop planting applications, such as corn and soybean, though not limited to soybean and corn. A nurse inductor system along with a central fill hopper can be used to enable a farmer to plant more acres before having to stop to fill the planter, resulting in quicker planting and less labor, while maintaining the precision spacing available by on-row singulation.

In U.S. Pat. No. 5,161,473, a nurse system is disclosed which works off a specialized cart. The air comes into the seed delivery area coaxial with the seed tube that takes the air and seed to the row units. With this system substantial energy is used to nurse the seed since the air changes direction abruptly. This particular nurse system provides a dedicated fan to feed the 12 rows to be planted from the nurse system. This system requires the adding or removing of shims to adjust for different line length, which is difficult and inconvenient to accomplish.

In September, 2002, Deere and Company introduced a planter with a central nurse system configured with one line to fill on-row mini-hoppers. The planter has a 12/23 row configuration, thus, when planting 12 rows, 13 of the rows must be plugged at the mini-hoppers. To plug the mini-hoppers, a special plug is placed in the non-active lines. However, these removable plugs must be stored by the operator when not in use, and can be easily lost or misplaced.

Another example of a nurse system is disclosed in U.S. Pat. No. 5,161,102 to Kongskilde. This nurse system distributes grain from a central hopper to a number of smaller hoppers. A metering device on each small hopper delivers to a number of seed boots. In this particular system, the operator is able to shut off one of the meter rollers independent of the other meter rollers, and is therefore able to stop the rotation of one section on the roller independent of the others. However, this system does not permit the operator to shut off the delivery to any of the nurse lines independently. U.S. Pat. No. 4,060,181, U.S. Pat. No. 6,047,652, and U.S. Pat. No. 6,267,067 teach other nurse embodiments with varying problems.

It is therefore desirable to provide a nurse inductor system that overcomes the disadvantages of the known prior art.

SUMMARY OF THE INVENTION

Accordingly, an important object of the present invention is to provide a nurse inductor system co-operable with a planter mechanism to feed seed or other particulate material to a planting mechanism for insertion of that material into the ground.

It is another object of this invention to provide a nurse inductor system operable for use with planters requiring singulation of the seeds for planting in the ground.

It is yet another object of the present invention to provide a nurse inductor system that can be easily switched from one crop spacing to another.

It is a feature of this invention that the nurse inductor system enables the use of an existing air cart for nursing individual planter units in a passive manner.

It is another feature of this invention that replacement of existing components on a conventional air cart with nurse induction components, to convert the standard air cart without requiring permanent modifications to the cart.

It is yet another feature of the present invention that in the header, the unoperational unit is not filled with seed.

It is another advantage of this invention that the induction of seed or other particulate product is accomplished more evenly and consistently, thereby reducing the possibility of a plugging of the lines.

It is still another advantage of this invention that a planting implement can be configured with respect to the number of rows to be utilized without requiring removable pieces that can be lost or misplaced.

It is a further advantage of this invention that the farmer can quickly verify the crop spacing on the distribution header.

It is yet another feature of this invention that bridging in the hopper side of the induction unit is avoided by increasing the room for particulate material to flow.

It is still another advantage of this invention that the air pressure and flow required by the nurse induction system is reduced, so that the existing fan on an air cart can be used for both nurse induction of seeds and the application of particles from one of more other air cart hopper(s) at the same time.

It is still another feature of this invention that the wings of the planter toolbar can be folded without the need to empty particles out of the planter seed reservoir before folding.

It is yet another advantage of this invention that the planter can be folded with the wings pivoted closer to the first row unit on the wing section of the planter row unit without interference between the planter seed reservoirs.

It is yet another advantage of this invention that more than one planter singulator can be fed with one nurse inductor line, thus enabling the development of a wider planter toolbar with substantially more planter units than previously available.

It is a further advantage of this invention that the nurse inductor mechanism can be used on an air cart that may also be used in dryland farming.

It is still a further object of this invention to provide nurse inductor mechanism for an agricultural seeding implement which is durable in construction, inexpensive of manufacture, carefree of maintenance, facile in assemblage, and simple and effective in use.

These and other objects, features, and advantages are accomplished according to the present invention by providing a nurse receiver header for an agricultural planting implement which is cooperable with a nurse mechanism that conveys a stream of seeds entrained in an air stream from a central hopper. A receiver is positioned at the planting mechanism to receive the seeds entrained in the air stream and accumulate a supply of seeds for utilization by the associated planting mechanism. The receiver header includes a plurality of legs and a rotatable baffle positioned internally at an uppermost position of at least one leg of the receiver header. The baffle is pivoted by an external lever that is positioned in the same orientation as the baffle to indicate the position of the baffle. The header can be placed in a closed configuration by positioning the baffle across the leg to be blocked. When in an open configuration, the baffle is positioned parallel to the leg and all of the legs of the header are open.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a perspective view of the particle hopper side of the nurse induction unit, with the exterior induction box wall removed, the nurse distribution lines being oriented in vertical pairs to leave open space between the lines for the seed particles to pass through;

FIG. 17 is an elevational view of a nurse system receiver header assembly of the present invention in a wide row configuration;

FIG. 18 is an end view of a nurse system receiver header assembly of the present invention in a wide row configuration;

DETAILED DESCRIPTION OF THE PREFERRED EMBODIMENTS

Figure 1:
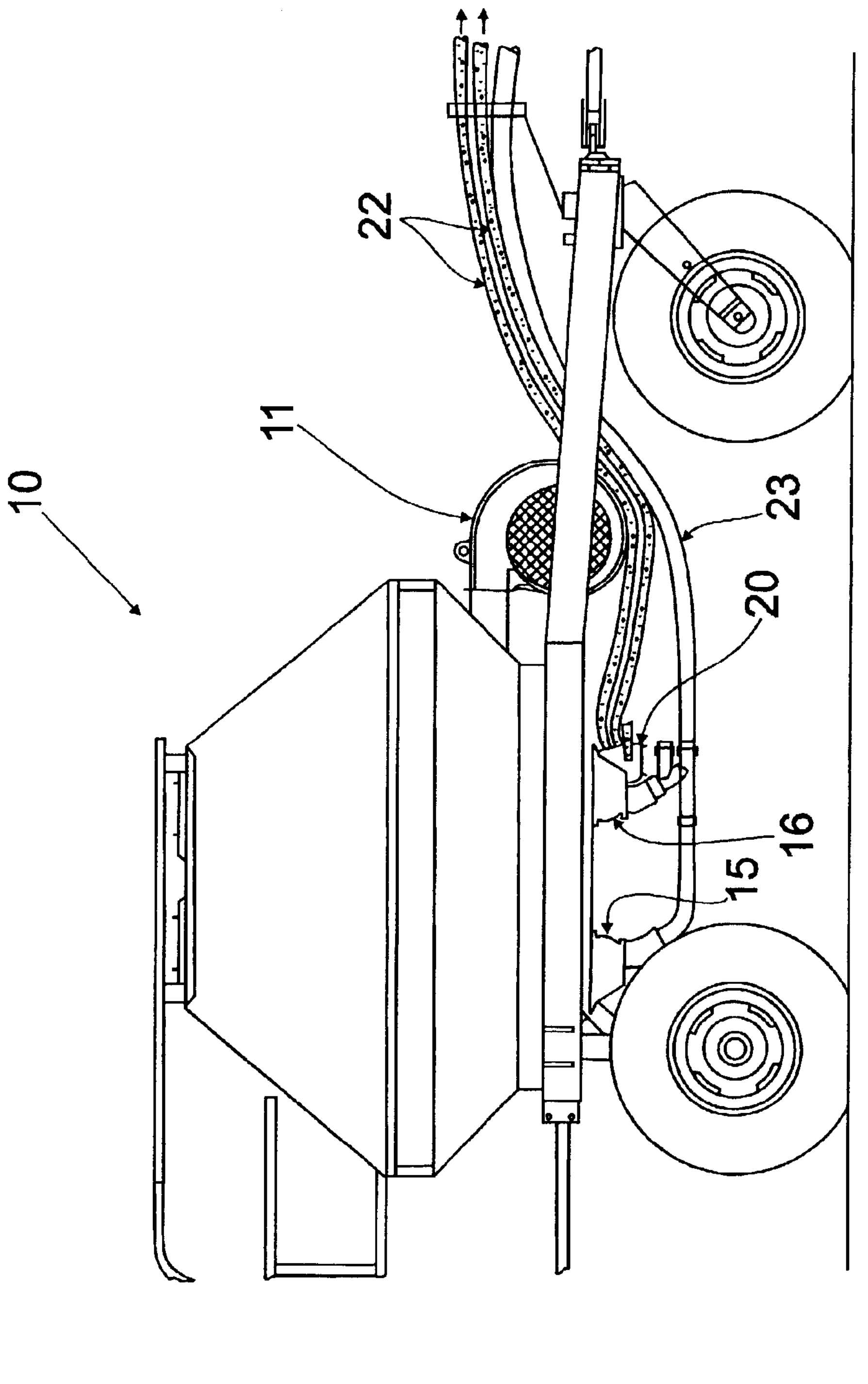
FIG. 1 is a side elevational view of a typical air seeder mechanism on which a nurse induction mechanism incorporating the principles of the instant invention is mounted.

Referring first to FIGS. 1–4, the principles of the nurse induction apparatus can best be seen. The nurse inductor 20 enables the use of a standard air cart 10 for both the central hopper and the nurse system air source. The air cart fan can be used for both fertilizing and nursing operations simultaneously. The inductor 20 can be designed in an adapter arrangement which enables the air cart 10 to be readily converted from a roller type volumetric metering system to the nurse inductor system, and vice versa. Such nurse mechanisms are described in, e.g., U.S. Pat. Nos. 6,289,830, 6,298,797, and 6,267,067, to Mayerle et al., the contents of which are incorporated herein by reference in their entirety.

The nurse induction adapter is mounted on a conventional air seeder or air cart, and redirects the air stream 13 coming from the fan 11 in an air cart meter box 16 into a path that leads through the nurse inductor 20. The air stream is guided into a nozzle region 30 that directs the air along a flow path that tangentially engages a pile of seed particles S exiting the opening 19 at the bottom of the seed hopper 12. The turbulence of the blast of air from the nozzle 30 loosens the seed particles from this assemblage of seed particles S exiting the opening 19 in the bottom of the seed hopper 12, entraining the individual seed particles into the air stream as it follows a path to the distribution lines 22 above the seed particle pile. The individual seed particles remain suspended in the air stream where the air bleeds off and the individual seed particles fall by gravity into a second pile or mass at the planting mechanism.

As best seen in FIGS. 3–7, the air stream 13 through the nurse inductor apparatus 20 is split at the general location of the seed particle mass at the bottom of the central seed hopper 12 on the air cart 10 into individual sections 31 that are isolated by generally vertical walls 32. Each individual section 31 leads to a different seed distribution tube 22 and, ultimately, to a different receiver header 45 and associated receivers 40. The nurse inductor 20 induces seed particles into the air stream when and where there is demand for the particles. The demand for particles is controlled by the level of product in each respective receiver header on the output end of the seed distribution tube. In smaller planting systems, the primary nurse lines 22 run directly to the receivers 40 without benefit of a receiver header 45. The nurse inductor 20 induces seed particles into the air stream when and where there is demand for the particles. The demand for particles is controlled by the level of product in each respective receiver 40 or receiver header 45 on the output end of the seed distribution tube. When the receiver header 45 is full, air is restricted from escaping from the seed distribution tube by the massed seed particles within the seed distribution tube. As a result of the filled receiver header 45, which prevents the passage of air there through, the air flow and air velocity reduce due to increased pressurization of the line. This resultant reduction in potential air pressure reduces the capacity of the flow of air to induce the seed particles into the corresponding seed distribution tube 22. Since the flow of air through the nurse inductor 20 is spread across the entire unit, the flow of air will tend to go to the lines that have open receivers because of the less airflow resistance.

The divider walls 32, that separate the air and entrained seed particle flows to each respective seed distribution tube 22, are sealed such that air cannot get into the seed distribution tubes 22 downstream of the pickup area. The sealed vertical walls 32 also prevent cross over of air and entrained seed to different seed distribution tubes 22. This division of airflow enhances operation since each line is operable to run at different times, depending on demand as represented by the massed seed particles in the output end of the seed distribution tubes 22.

The shape of the air and entrained seed particle flow path has an impact on the performance of the inductor. When the receiver 40 or receiver header 45 is filled, only a small volume of air flows through the receiver and seed delivery is stopped. Air is still capable of traveling through the lines, through the massed seed particles, and past the seed particles at the vent. If seed particles were to be allowed to be induced into the lines with airflows that are less than carrying velocity, a blocking of the seed distribution tubes 22 can occur. This problem of blocking the seed distribution tube 22 can be avoided by forming the portion of the inductor structure, just above the area adjacent to the bottom of the central seed hopper where the individual seed particles are entrained into the airflow, larger so that the air velocity slows down in this region.

With the slowed air velocity, any seed particles that had been entrained into the slow flowing air stream fall out of the airflow and are dropped back into the seed particle mass region. Thus, the seed particles are picked up and carried by the air stream only when the air velocity is above the minimum carry velocity, thereby allowing air to be flowing slowly without transporting any entrained seed particles into the full seed distribution tube. Correspondingly, the cross-sectional area of the seed distribution tubes is smaller than the cross-sectional area between the generally vertical walls dividing the plenum into discreet channels. As a result, the air velocity increases once entering the seed distribution tube, allowing the seed particle to be retained within the air stream once it enters the seed tube.

The regulator 25 for the flow of seed particles into the area for entrainment within the air stream is defined by a movable gate 29 forming a common edge along which seed particles flow into the particle pick-up area. The product regulator 25 extends across the entire nurse induction apparatus 20. As the seed particles flow under the product regulator, the seed particles form a pile falling naturally at the angle of repose of the seed particles. The angled surface of the pile of seed particles forms the bottom wall of the air channel in the pick-up area. The proximity of the air nozzle 30 to the wall of product affects the amount of product carried in the air stream. As the regulator 25 is rotated and more or less product is permitted to pass through the opening 19*a* at the bottom of the central seed hopper 12, the seed particles fall either closer to or farther from the air nozzle 30. Since different products, such as different seed types, have properties that affect how easily the air stream picks them up, as well as the differences in the angle of repose at which the products slump, the ideal distance between the product surface and the air nozzle varies with the product being distributed. The product regulator 25 is adjustable to enable the optimum distance to be set for each product type, as well as the desired flow rate.

As the air stream 13 strips the product away close to the bottom of the product regulator 25, product from the hopper 12 replenishes the created cavity. The closer to the bottom of the regulator 25 the product is stripped away, the more quickly the product is replenished. Thus, when the regulator 25 is positioned correctly for the specific type of product being nursed, the induction of product into the air stream is relatively steady. During testing, it was found that steady induction of product into the air stream reduced plugging problems within the distribution tubes 22 while maximizing product delivery efficiency.

The product regulator 25 is located on the hopper side of the induction box so that it does not interfere with the seal of the divider walls 32. The product regulator 25 is formed as a single crescent shaped plate 29 that extends across the entire width of the induction unit 20. The regulator plate 29 is attached to a shaft that is rotated by an external handle 28. Thus, the flow of product across the induction box is controlled with the adjustment of a single handle 28. As a result, the flow rate of seed particles can be controlled for all of the tubes 22 simultaneously, and can be completely shut-off to permit clean-out during which process the air will still be guided through the distribution tubes 22 without carrying seed particles. The rotatable regulator plate 29 can be adapted easily for remote control by appropriate actuators connected to the regulator 25. Such a configuration is particularly advantageous in precision farming practices, as the flow of seed particles through the seed distribution tubes 22 can be turned on and off easily. Alternatively, the inductor box 20 could be configured to control the flow of air through the nozzle 30 instead of the flow of seeds.

Figure 5:
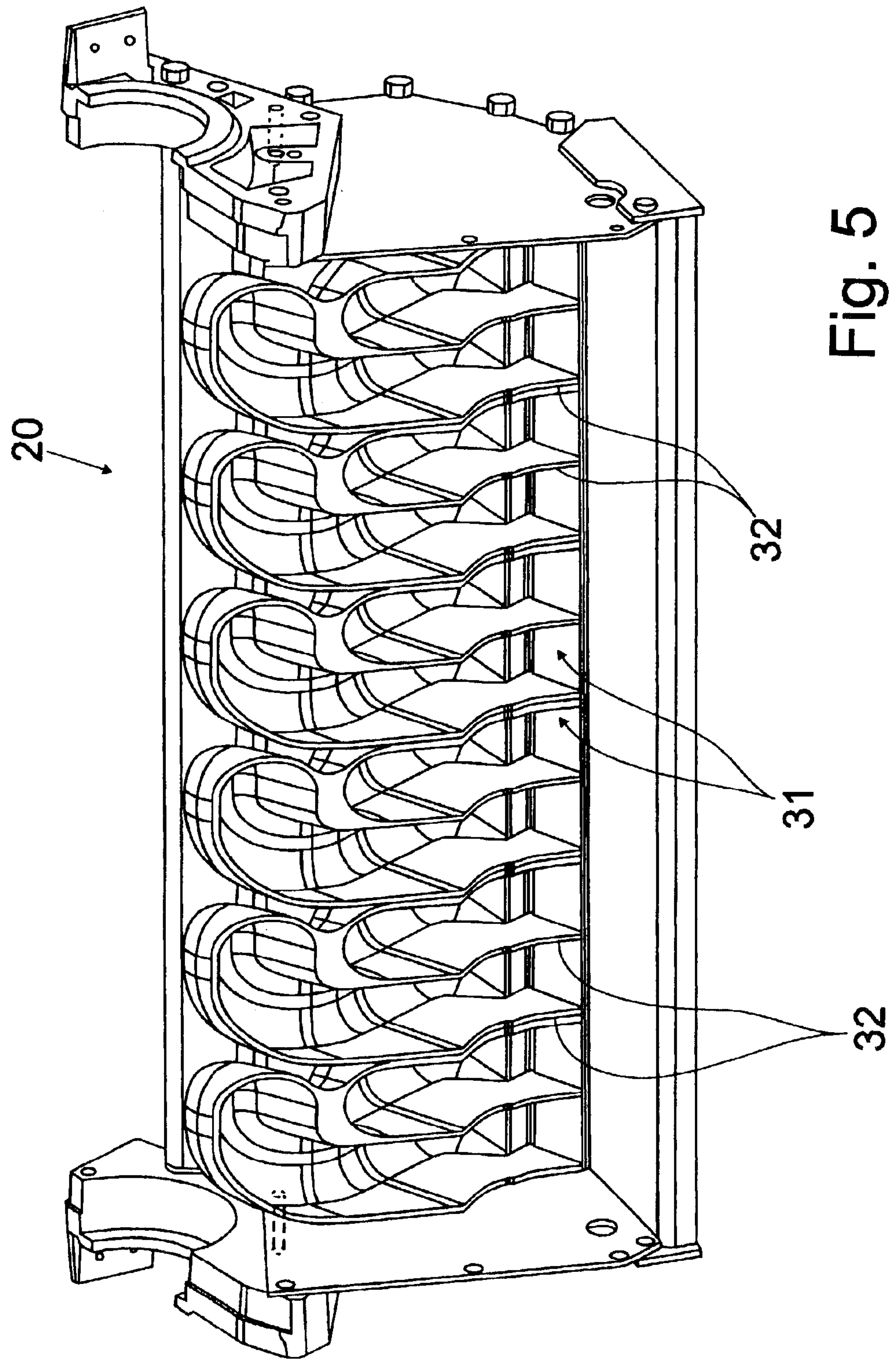
FIG. 5 is a perspective view of the divider wall portion of the nurse induction apparatus to depict the divider walls separating the uppermost and lowermost seed distribution tubes.
Figure 6:
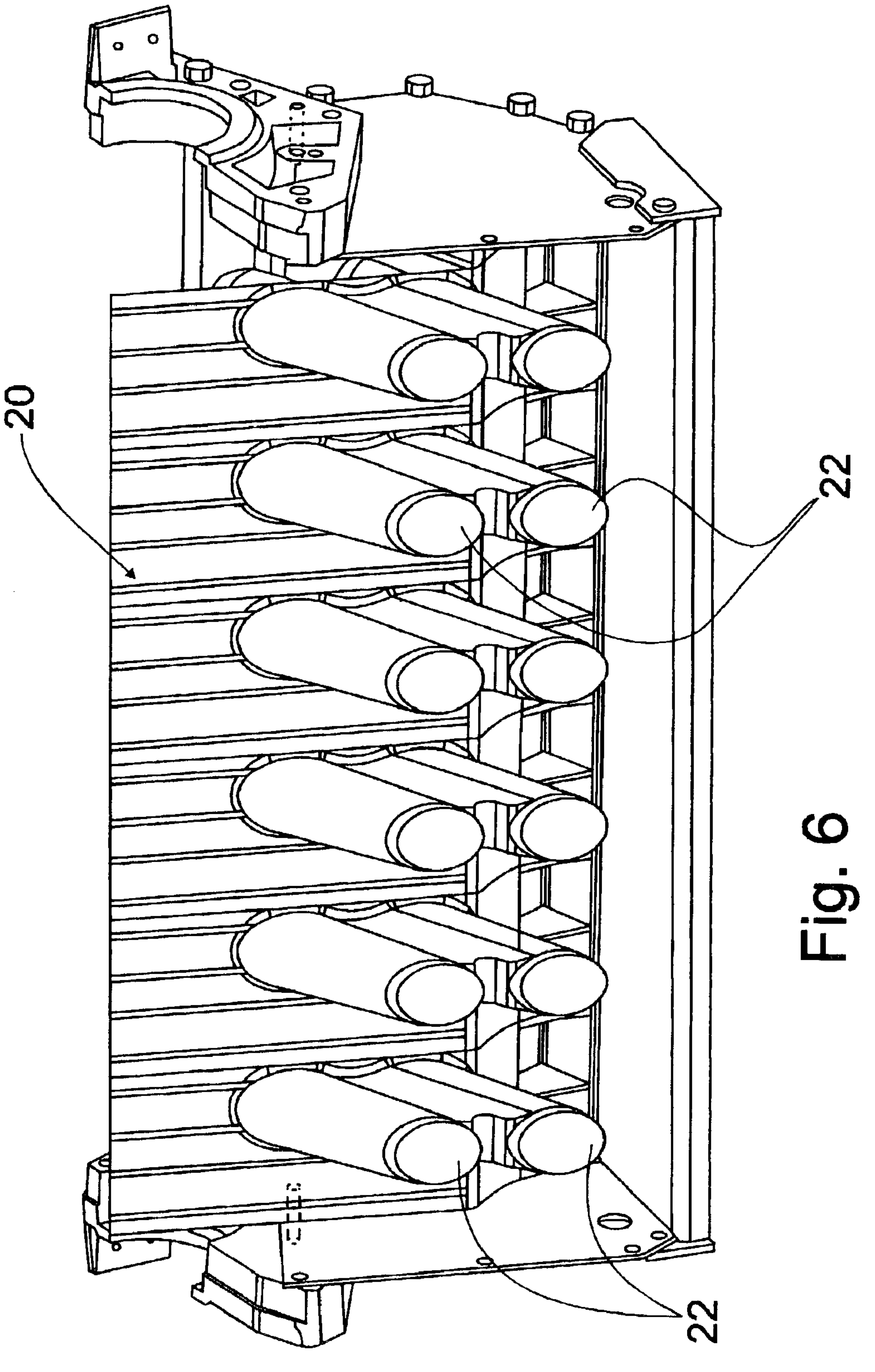
Figure 7:
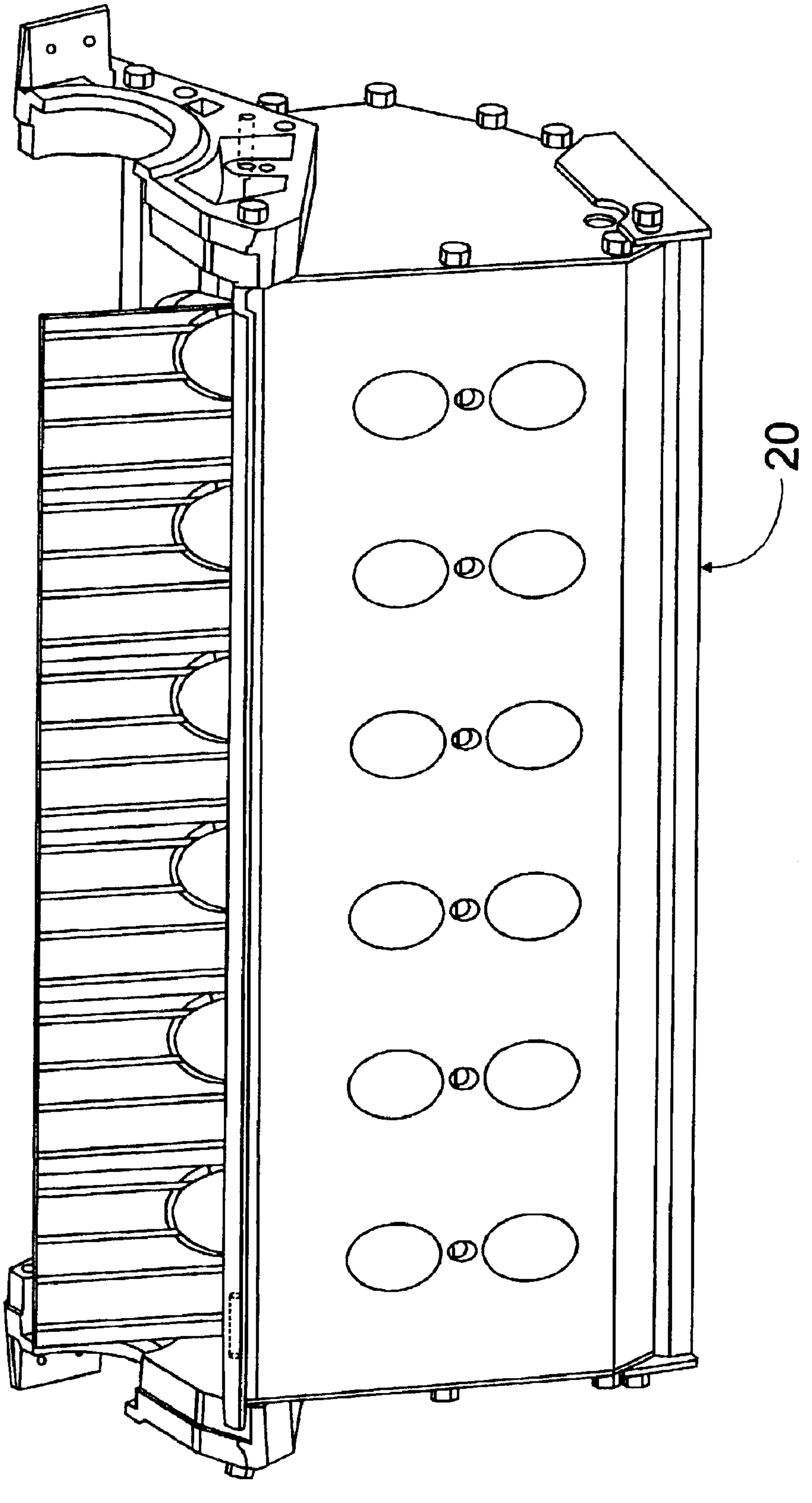
FIG. 7 is a perspective view of the outlet side of the nurse induction unit seen from the exterior of the apparatus.
Figure 8:
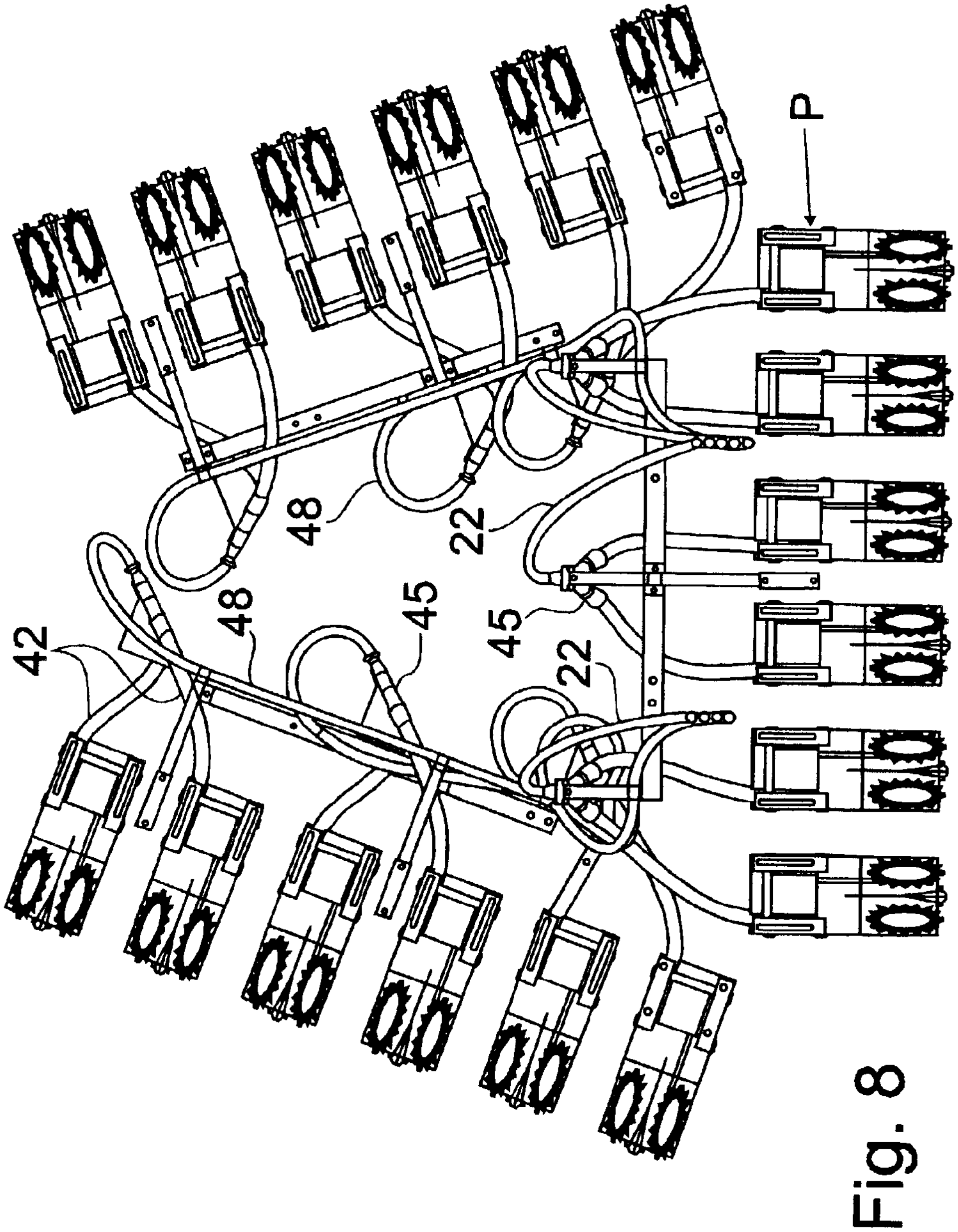
FIG. 8 is a front elevational view of a typical planting mechanism adapted for operative association with a parallel nurse system depicted in FIG. 1 and incorporating the principles of the instant receiver header invention, the side wings of the planting mechanism being folded upwardly relative to the central section to place the planting mechanism in a transport position.
Figure 9:
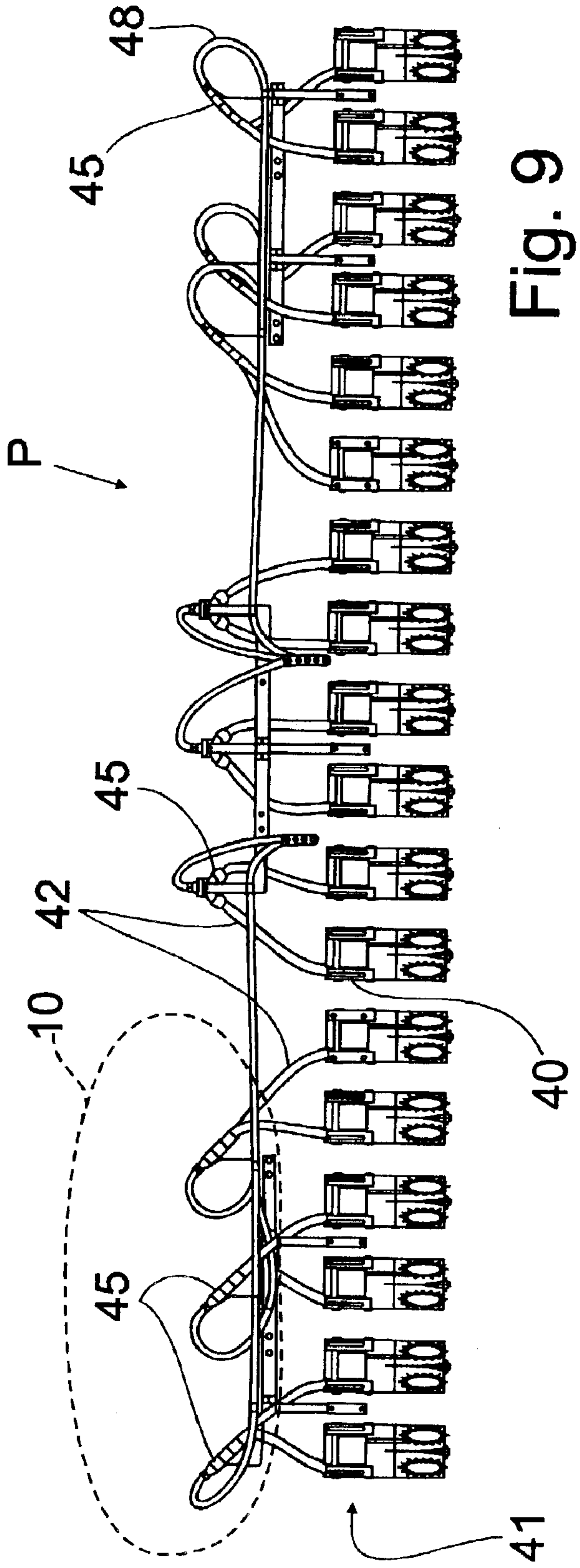
FIG. 9 is a front elevational view of the planting mechanism depicted in FIG. 8 except with the side wing sections being folded down into an operative position.
Figure 10:
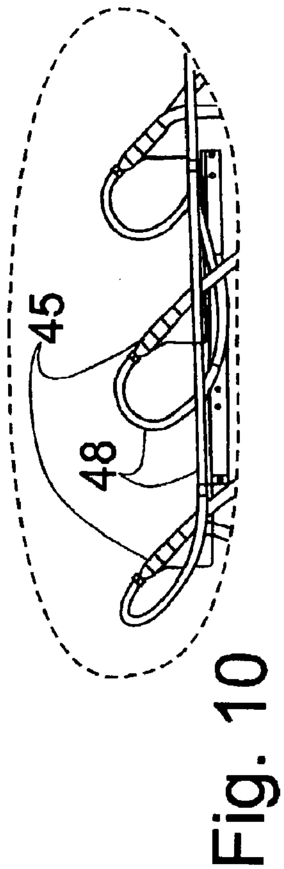
FIG. 10 is an enlarged elevational view of the nurse system receiver apparatus corresponding to the circled mechanism within FIG. 9.

The generally vertical divider walls 32 are constructed such that the nurse inductor apparatus is made in pair segments that are stacked to fit the width of the induction box. The vertical nature of this modular design allows the inductor apparatus to be compact. The modularity of such a design allows the nurse inductor to be easily adapted to different widths and numbers of product lines, including a compact induction box width having a large number of product lines. To allow more space on the particle hopper side of the inductor unit, the distribution tubes 22 forming the outlet pipes are stacked in vertical pairs. The additional space between outlet pipes reduces bridging of the particles as they flow past the pipes and into the region of the product regulator 25. Each distribution tube 22 is independent. The walls 32 dividing the distribution tubes are curved to direct the air and entrained seed particle stream as shown in FIG. 5. The air and entrained seed make relatively small directional changes in the inductor apparatus, which improves the efficiency of the air system. This efficiency enables both the nursing of more than 12 rows and the use of the second air cart tank for simultaneous fertilizer operations.

Figure 2:
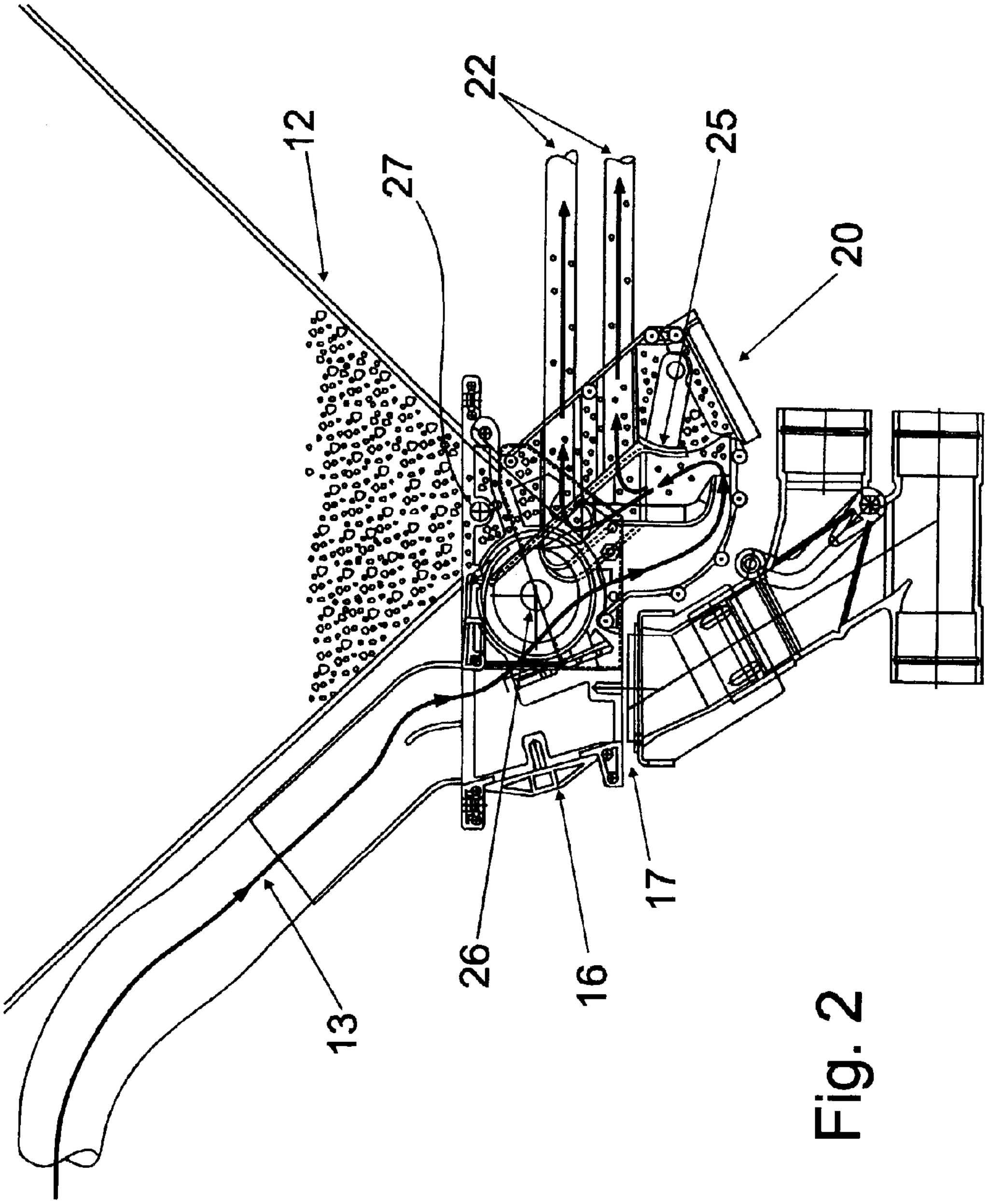
FIG. 2 is a schematic cross-sectional view of the nurse induction system depicted in FIG. 1, the arrows depicting the direction of air flow through the mechanism.
Figure 3:
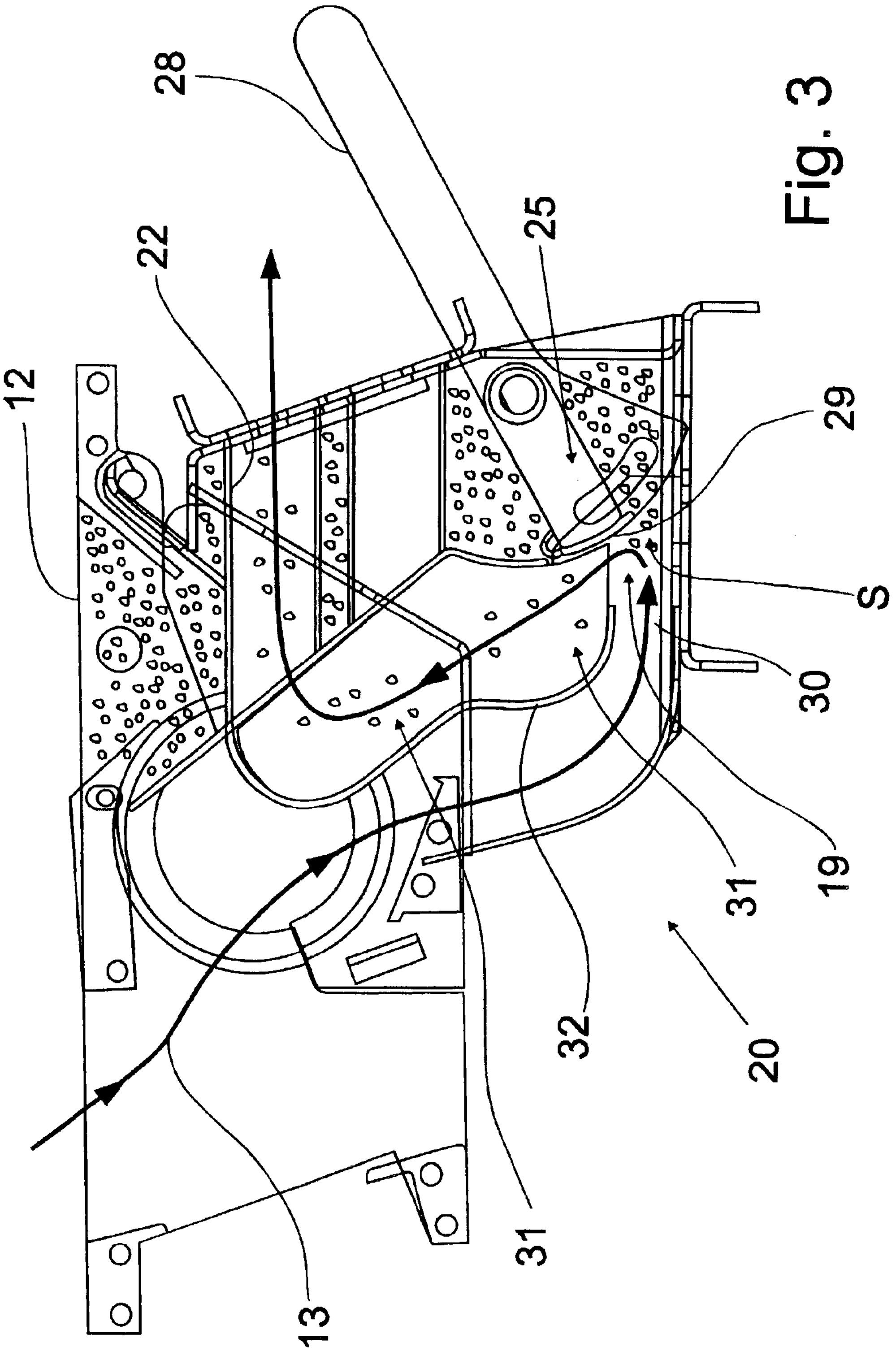
FIG. 3 is an enlarged schematic cross-sectional view of the nurse induction mechanism shown in FIG. 2 to depict the flow of air and seed through the uppermost seed distribution tubes leading to the planting mechanism, the arrows depicting the direction of air flow through the mechanism.
Figure 4:
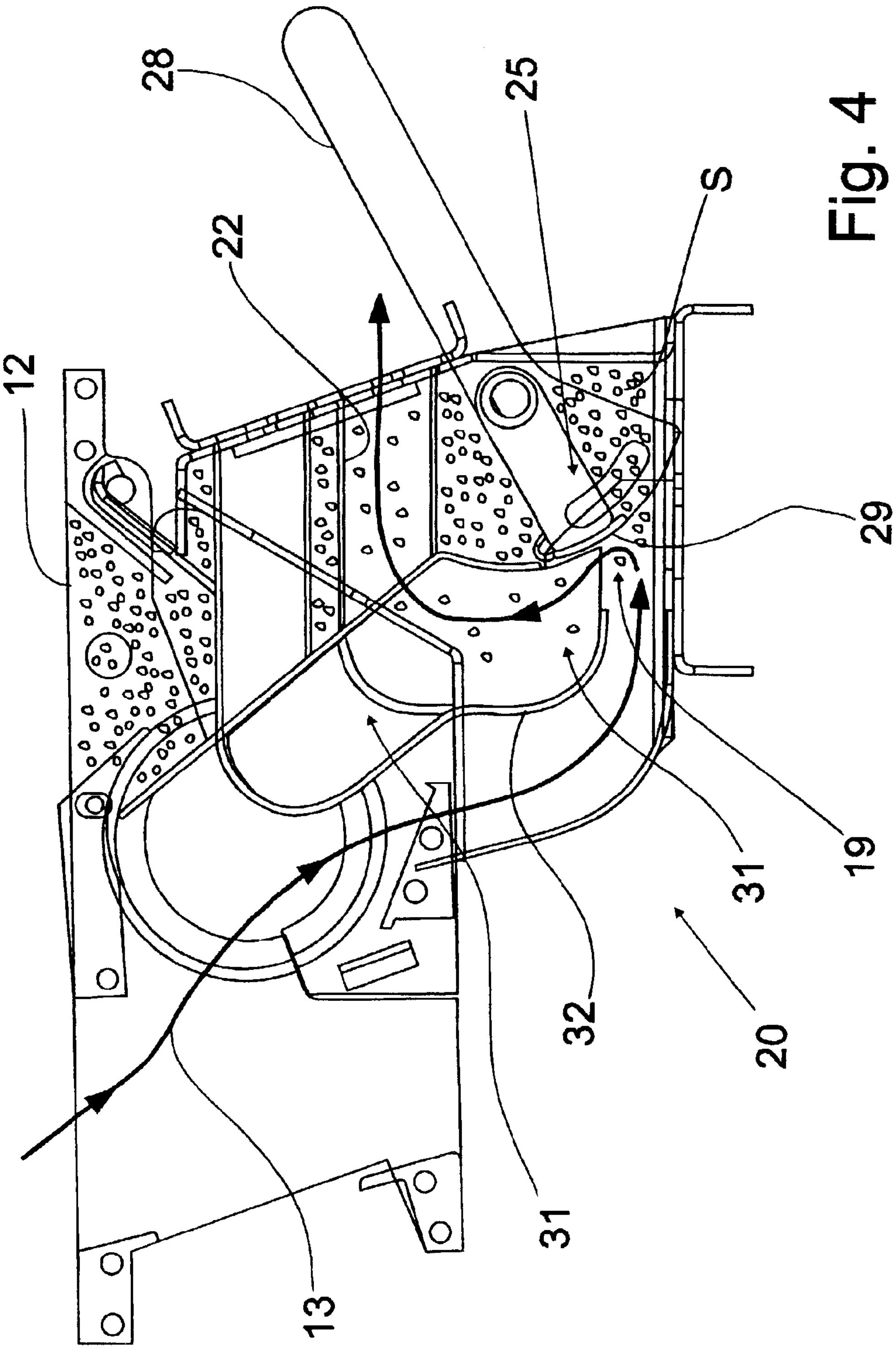
FIG. 4 is an enlarged schematic cross-sectional view similar to that of FIG. 3 except depicting the flow of air and seed through the lowermost seed distribution tubes to the corresponding planting mechanism, the arrows depicting the direction of air flow through the mechanism.

Alternatively, the nurse induction unit 20 is adaptable for use with a stand-alone tank, as well as for with an air cart. Furthermore, the nurse induction unit 20 can also be adaptable to other planter units. As best seen in FIGS. 1 and 2, the nurse induction apparatus is preferably formed as a modular unit that can be inserted into a standard air cart structure to convert the air cart from a straight meter box into a nurse induction box. The conventional air delivery tubes 17 are sealed and remain on the air cart 10, while the nurse induction unit 20 is interposed to receive the air stream 13 from the fan 11. A connection mechanism 16 facilitates the convenient connection of the nurse unit 20 to the air cart 10 as a modular component.

One skilled in the art will recognize that the present invention is not limited to the conveyance of seed particles, as other particulate matter is commonly distributed through an air cart system, such as fertilizer. Furthermore, the typical air cart 10 is provided with multiple hoppers or tanks containing different product to be planted in the ground. One tank could have seed stored therein, while another tank would have fertilizer and yet another tank could have herbicides or still another reservoir of fertilizer. In such multi-tank configurations, one of the tanks could be provided with a nurse induction unit 20 to convey seeds to the planting devices, while a conventional meter box is used to control the flow of fertilizer or other product to the planting devices by separate distribution tubes. Such a conventional meter box could apply the fertilizer or other product at a variable rate and could be controlled by an electronic controller, as is known for precision farming techniques. Other alternative configurations can include one tank nursing seed to all the singulators, as well as multiple tanks nursing seeds to any one particular singulator.

Referring now to FIGS. 8–18, the nurse system receiver 40 and receiver header 45 can best be seen. The receiver 40 and receiver header 45 are used in conjunction with the nurse inductor system 20, such as the one described above. One skilled in the art will recognize that the header 45 is needed in configurations where the flow is to be split between multiple receivers. The nurse inductor 20 sends an air and entrained particle stream to the receiver header 45 when the receiver header 45 has less than a desired level of product particles in it. The receiver header 45 is designed to allow air from the air and entrained particle stream to escape when the particle level is below the air vent 50, but to limit the amount of air to escape when the particle level is above the air vent 50.

The nurse line 22 leading to the header 45 is smaller than the lines 42 between the header and the receiver 40 to reduce the velocity of the air flow at the receiver header 45, thus allowing the entrained seed particles to drop out of the air stream and fall by gravity to the receiver 40. To stop particle blocking in the nurse line 22, the receiver header 45 is mounted such that the inlet line 48 is always vertically above the outlet lines 42, regardless of the position of the implement. Moreover, the header 45 never inverts, so the seed particles stay in the receivers 40 when the implement is moved between operating and transport positions.

Figure 14:
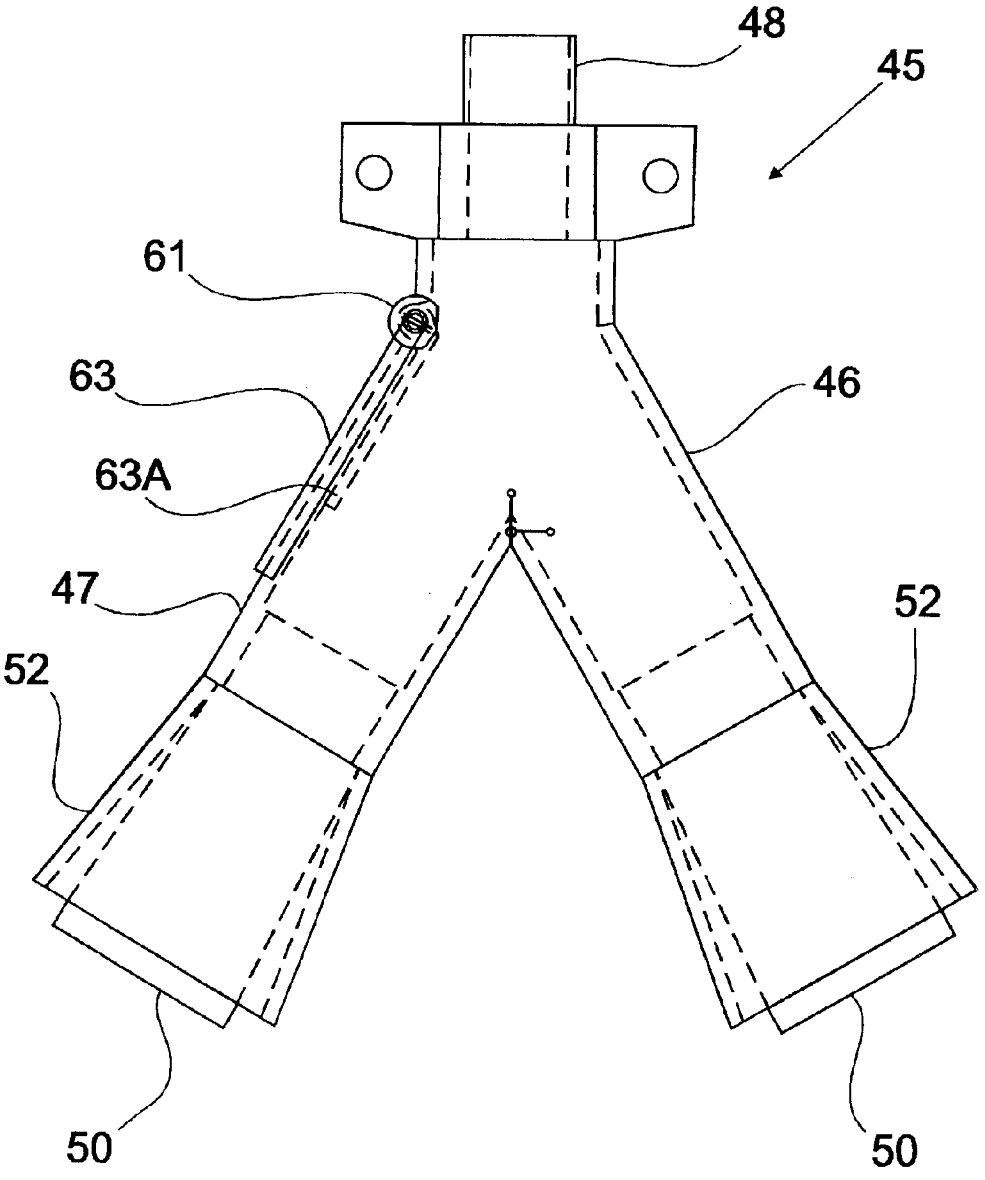
FIG. 14 is a front elevational view of a nurse system receiver header assembly of the present invention in a narrow row configuration.

In operation, the seeds are massed in the receiver 40 and in the line 42 from the receiver 40 up to the receiver header 45, which is formed of two legs 46, 47 in fluid communication with an inlet line 48. As shown in FIG. 14, a rotatable baffle 63A is located in the header Y to enable an operator to close off one leg of the header 45. The baffle can be operated in the header 45 by an external lever 63 that is pivotable at a pivot 61. The external lever 63 is positioned in the same orientation as the baffle. Therefore, the position of the external lever 63 also designates the position of the rotatable baffle. If the operator desires both legs of the header 45 to be operational, such as for narrow row plantings, e.g., 15 inches apart, the header 45 can be placed into the open configuration by positioning lever 63 such that it is parallel with leg 47. In the open configuration, the seed particles are directed into both leg 46 and leg 47 of the header 45.

Figure 11:
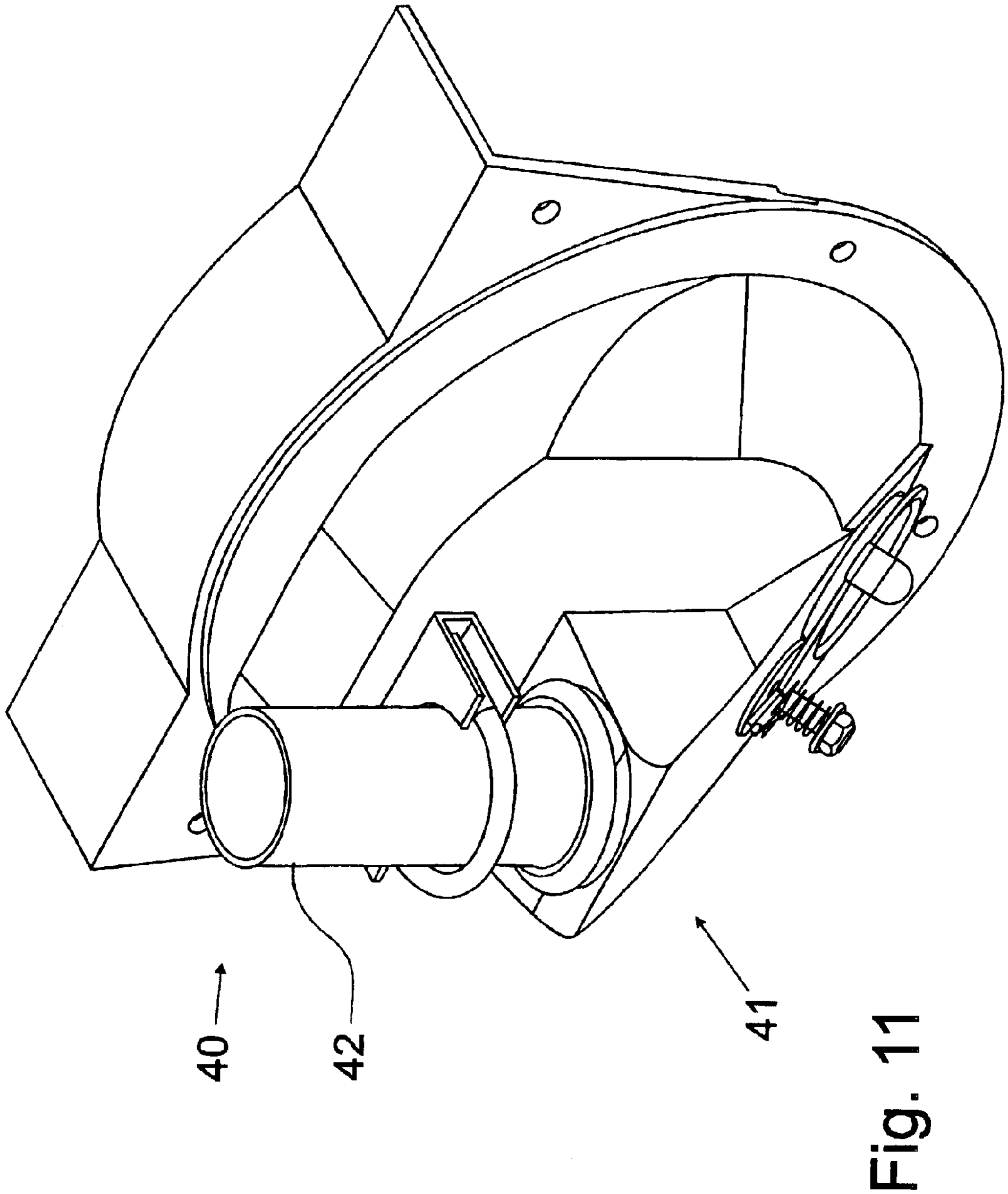
FIG. 11 is an enlarged perspective view of the nurse system receiver assembly.
Figure 12:
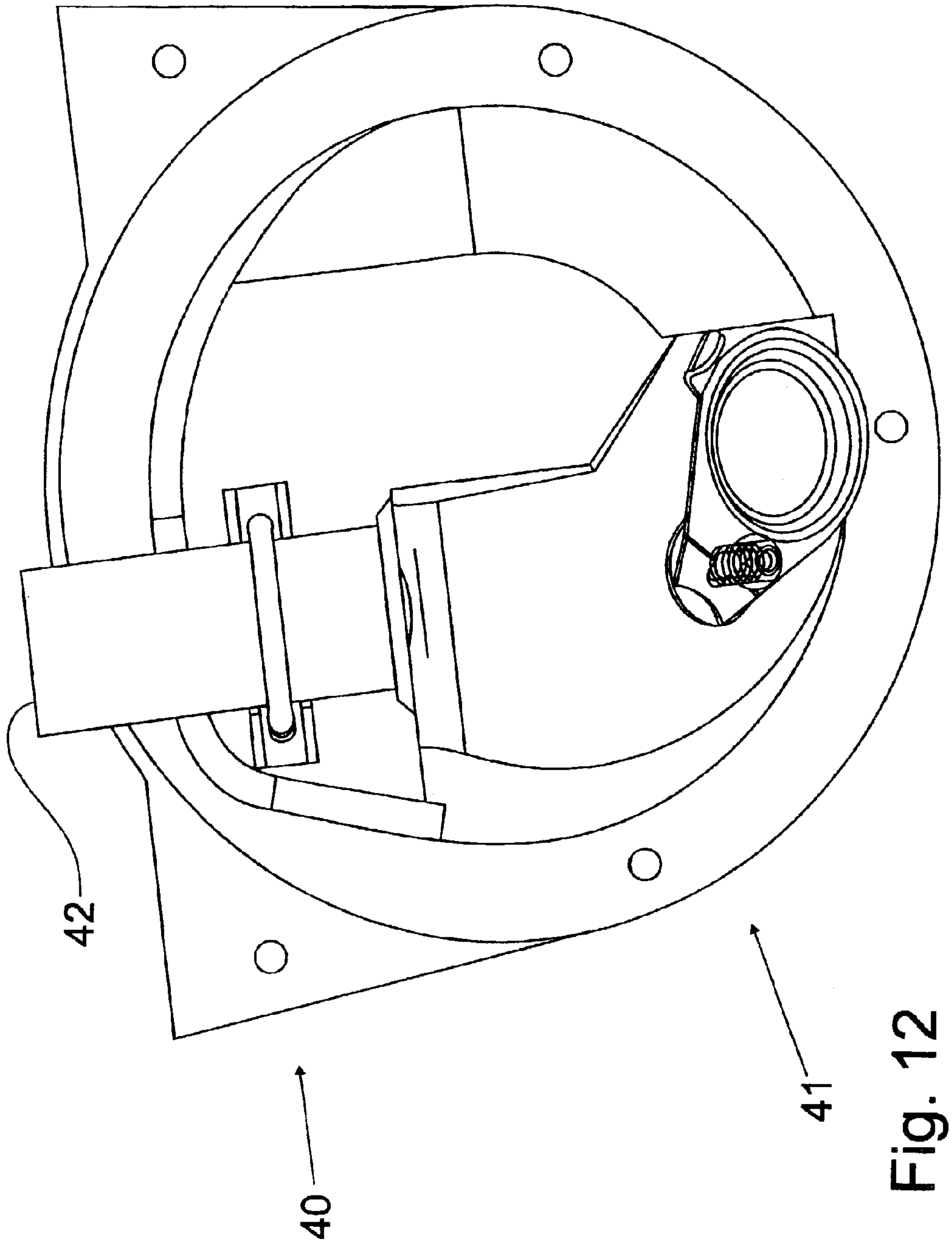
FIG. 12 is an enlarged front elevational view of the nurse system receiver assembly shown in FIG. 11.
Figure 13:
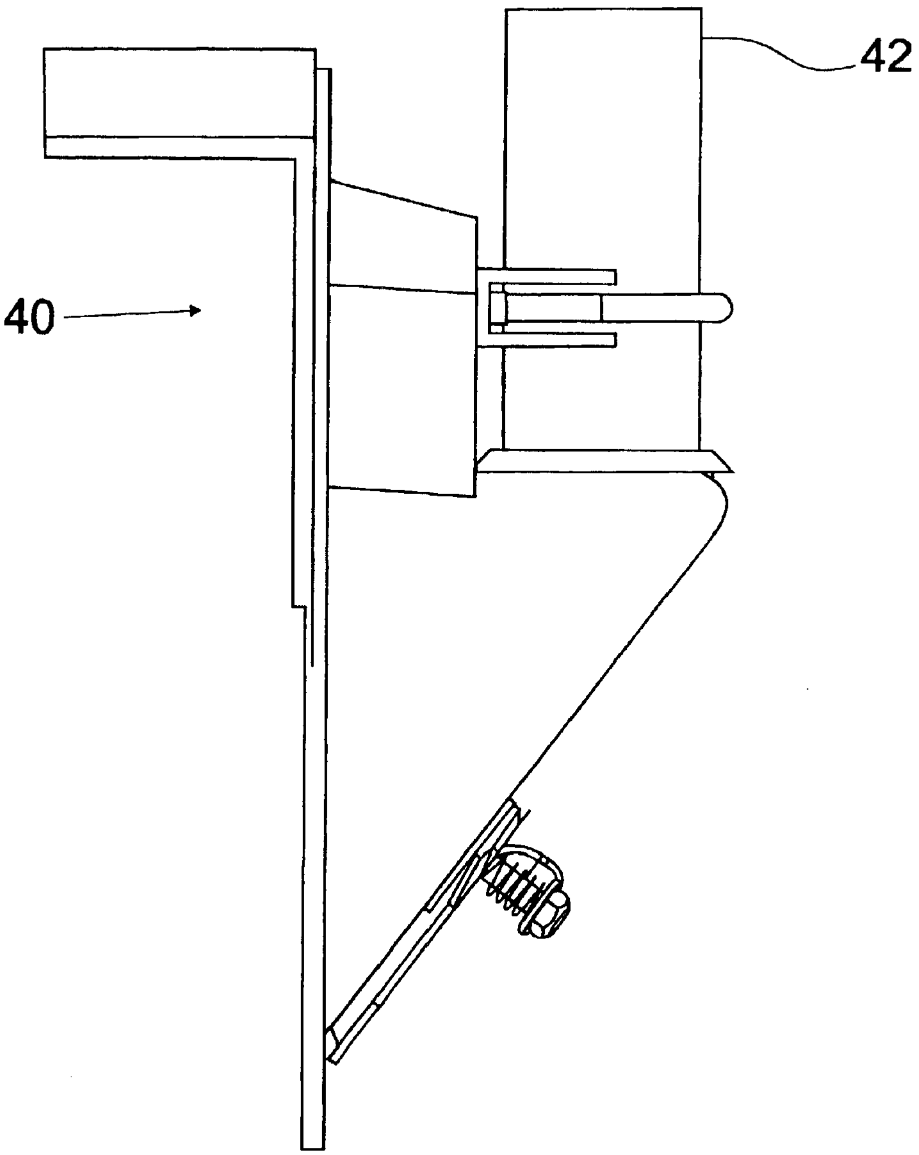
FIG. 13 is an enlarged side elevational view of the nurse system receiver assembly shown in FIG. 12.

The receiver 40, as best seen in FIGS. 11–13, provides a small mass of seeds in the location of the singulator meter's pickup area 41. In the open configuration, when the seeds are accumulated up to the top of one leg, e.g., leg 46, they block the flow of air through the air vent 50 near the header bottom. When the air does not flow freely through the air vent 50, the flow of seeds from the nurse inductor unit diminishes. Only the small flow of air that can escape through the seeds and vent 50 will continue to flow. This airflow is too low to entrain or pick up seeds.

If only one leg is full, seeds will continue to be nursed into the empty leg, e.g., leg 47, until the air vent 50 is covered in the second leg. Then, the airflow to the header 45 will drop off and seeds will not be sent in the nurse line 22 until such a time that one of the receivers 40 empties the receiver header 45 below the air vent 50. The vent hood 52 makes a roof over the vent 50 to allow the air to be vented out and guard against rain and contaminants getting in. The orientation of the receiver header 45 always keeps the hood 52 opening facing down, even when the toolbar is rotated into the transport configuration. In an alternative embodiment, the vent and rain guard may be incorporated directly into the receiver design if a separate header is not desirable.

Alternatively, if the operator desires to plant in wide rows, e.g., 30 inches apart, the rotatable baffle 63A can placed into the closed configuration by positioning the external lever 63 such that it is positioned across leg 47. As discussed above, the position of the external lever 63 indicates the position of the rotatable baffle 63A. In this closed configuration, all of the seed flowing from the receiver 40 is directed into leg 46 of the header 45. By blocking the flow of air to leg 47, seeds are not unnecessarily placed in an unoperational unit.

Figure 15:
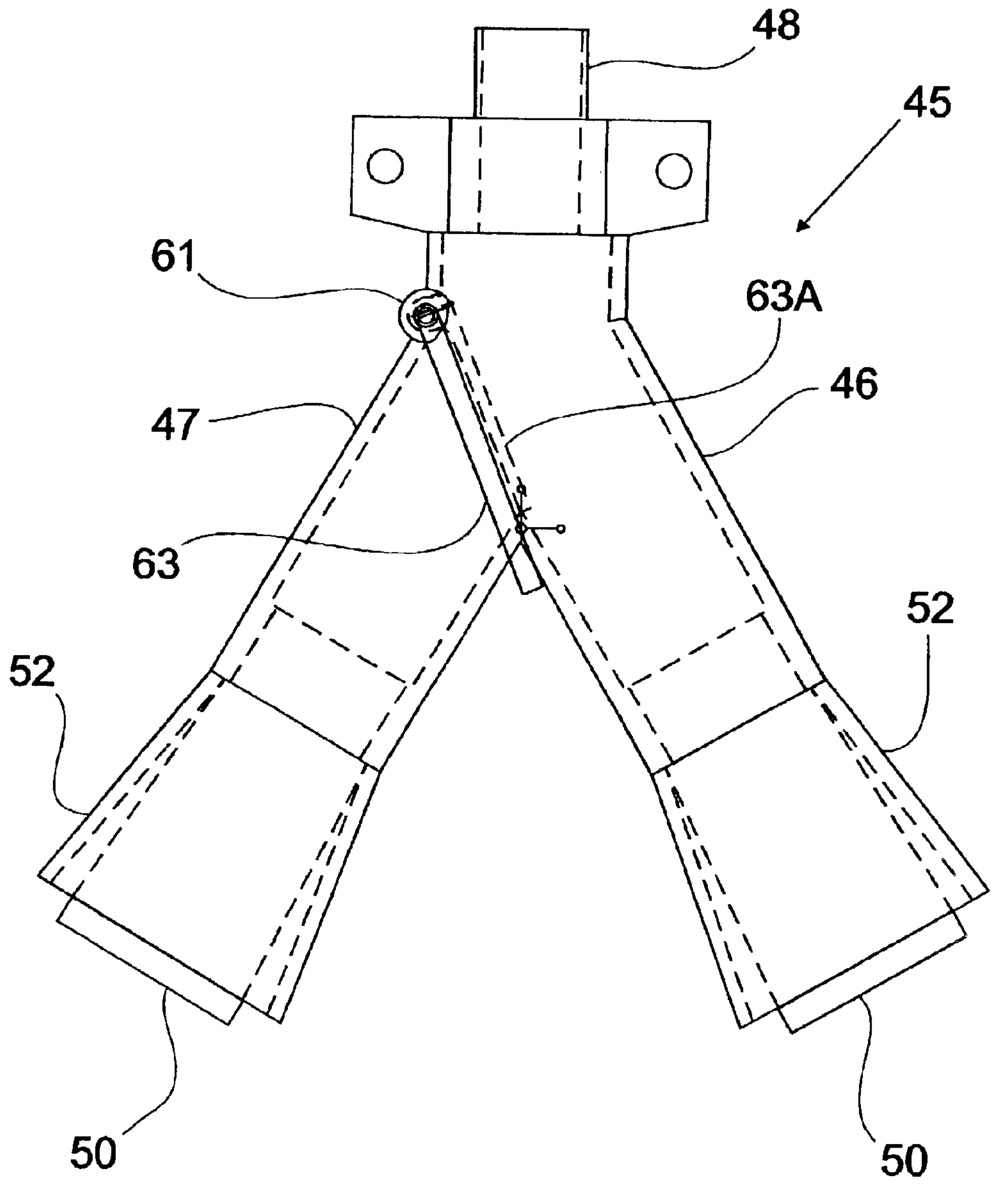
FIG. 15 is a front elevational view of a nurse system receiver header assembly of the present invention in a wide row configuration.
Figure 16:
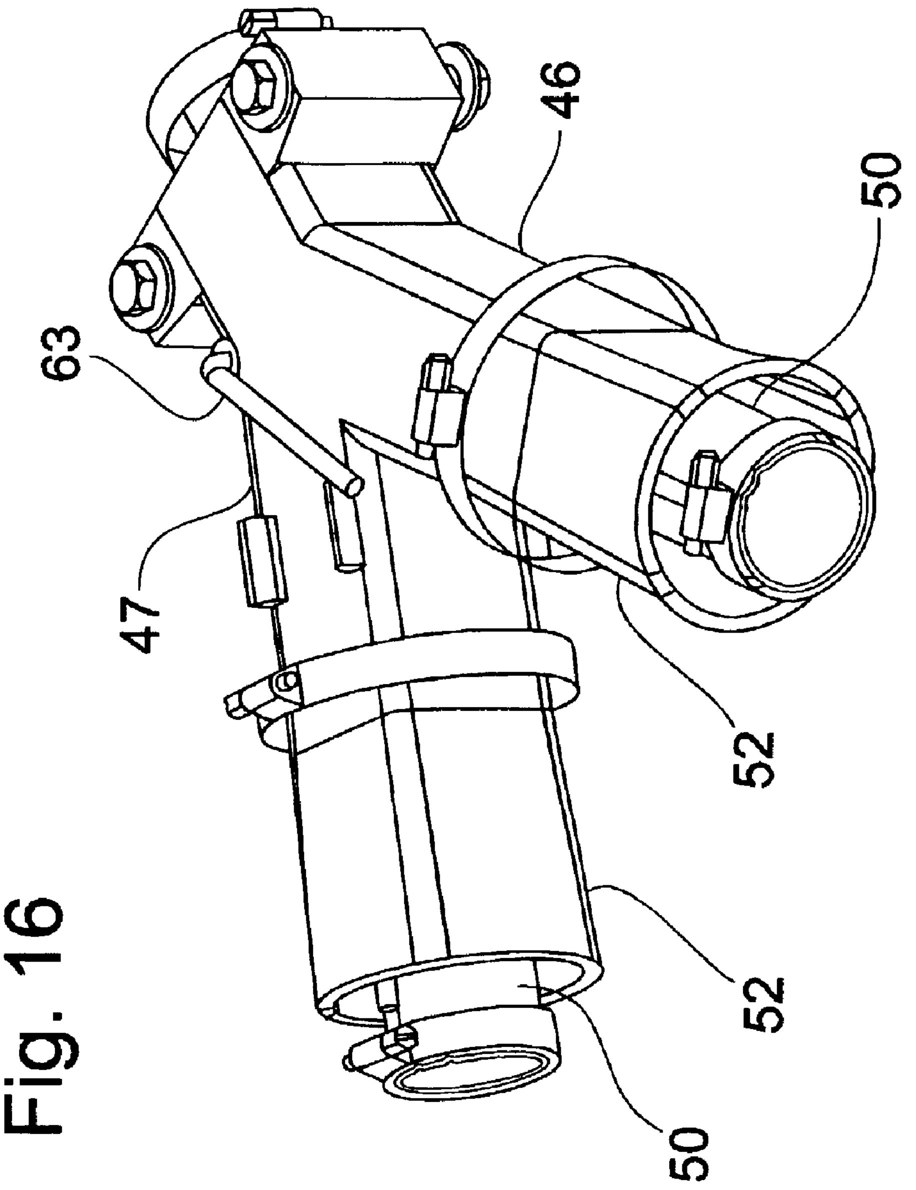
FIG. 16 is a perspective view of a nurse system receiver header assembly of the present invention in a wide row configuration.

As shown in FIGS. 14–16, the lever 63 on the outside of the header 45 is designed to allow only one leg of the header 45 to be shut off. However, the header 45 can be mounted on either the top or the bottom surface to allow either the left or right side (i.e., leg 46 or 47) to be controlled. Furthermore, because lever 63 indicates the position of the rotatable baffle 63A in the header 45, the operator can quickly go across the implement and determine the baffle position for appropriate seed placement into the field (i.e., narrow or wide rows), or quickly change from a narrow seed placement to a wide seed placement and vice versa.

It should be noted that although a two legged header is described herein, other embodiments of the receiver header 45 would use the header in triple or other variations. For example, the triple configuration would be similar to the double configuration described above with the addition of another leg and another baffle.

A preferred embodiment for use with smaller planters using a parallel distribution system (i.e., where a primary nurse line runs directly to a receiver) includes an internally reconfigured inductor box so that seed cannot be picked up and delivered to inactive receivers, singulator meters, or row units. An internal baffle covers the entry to the inactive rows, thereby preventing the product to be picked up. An external lever corresponding to the internal baffle position allows the operator to determine the operational position. Because one lever adjusts the position/operation of many lines, there is only one simple, central adjustment necessary to activate or inactivate rows.

In a second preferred embodiment for use with smaller planters using a parallel distribution system, a valve, such as a ball valve, is located on distribution tubes associated with inactive rows during wide row planting to stop airflow in the tube. Typically, the ball valve is actuated by a lever. When the valve is closed, air is not permitted to flow through the distribution tube, and, as a result, no seed is delivered to the receiver header and associated receiver. Because air and entrained seed is not permitted to flow through a particular distribution tube, the seed cannot enter the tube or plug the tube. The lever on the ball valve serves as an indicator for the operator to quickly determine whether the distribution tube is open or closed.

Figure 19:
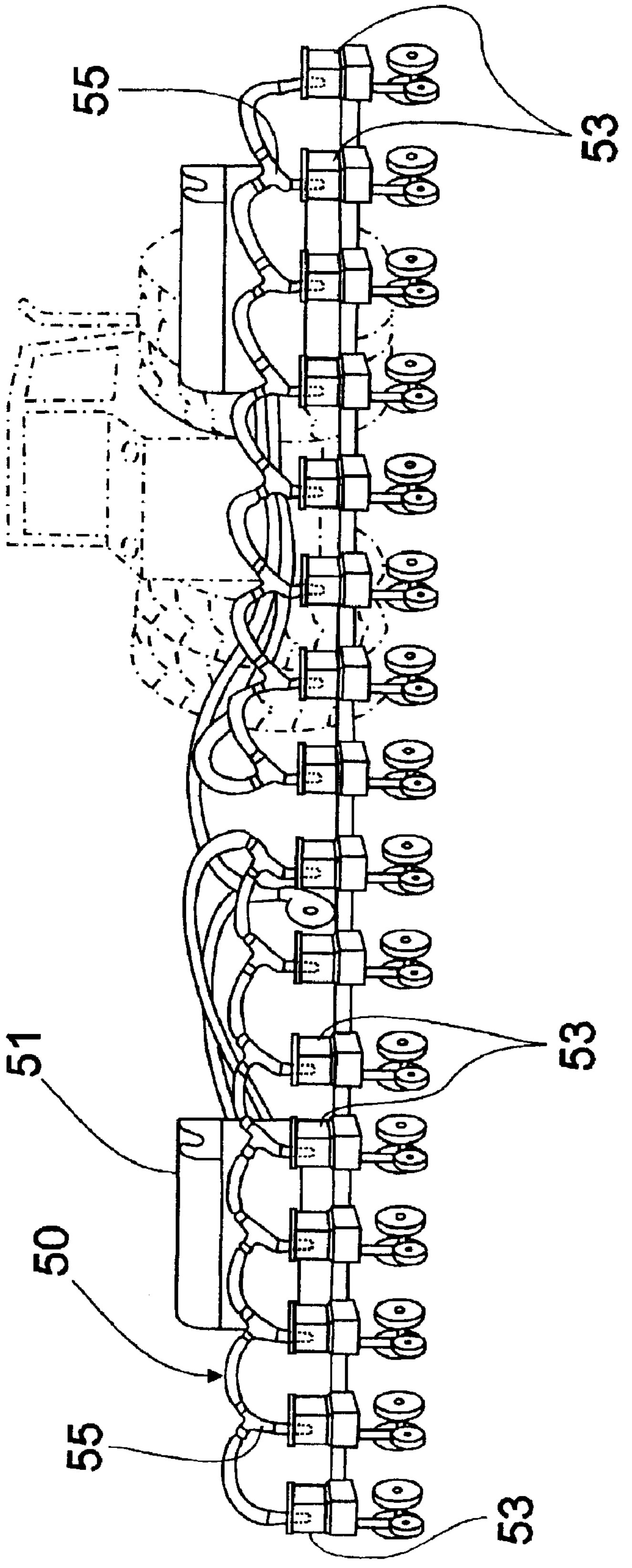
FIG. 19 is a front elevational view of a planting mechanism adapted for operative association with a series nurse system and incorporating the principles of an alternative embodiment of the present invention.
Figure 20:
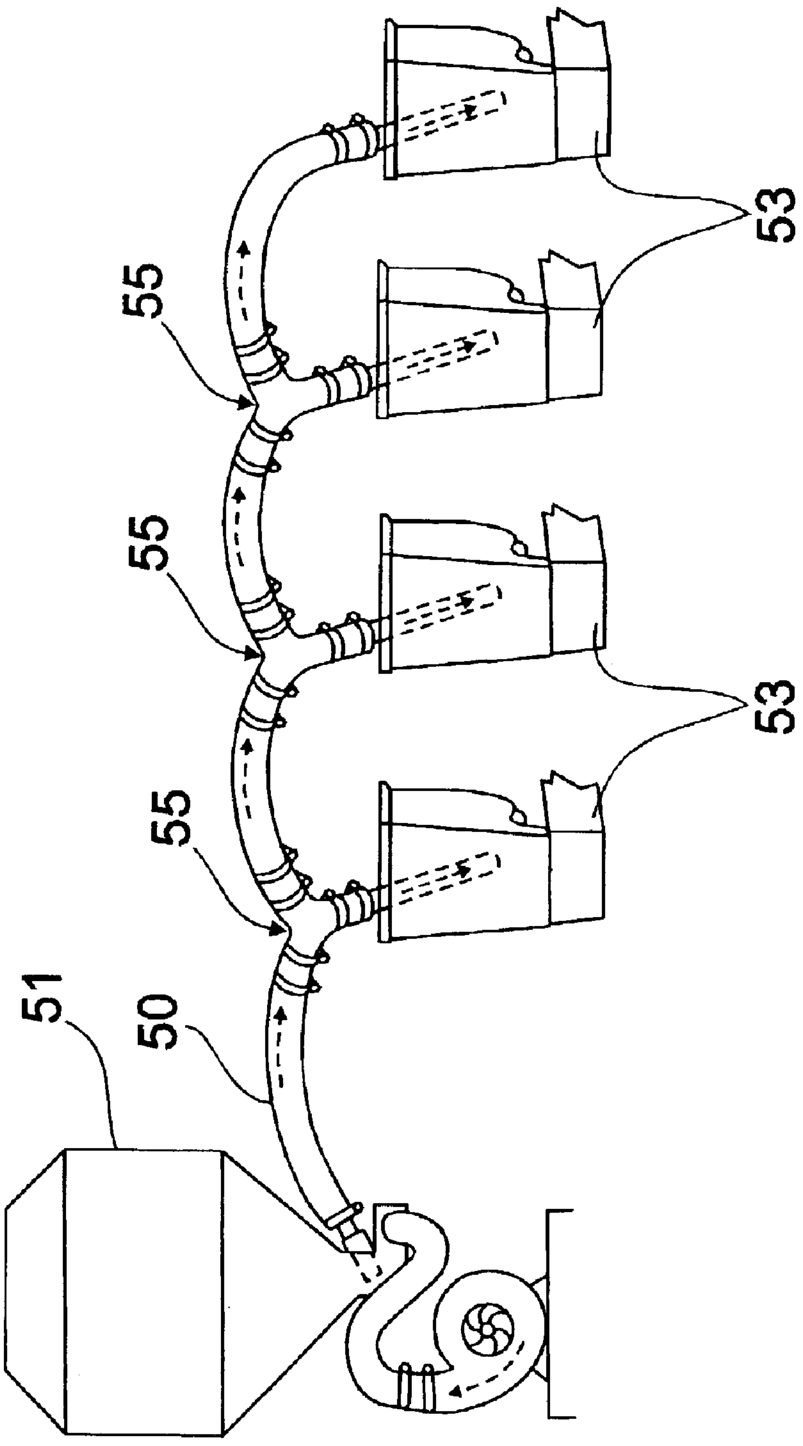
FIG. 20 is an enlarged partial schematic of a series nurse system incorporating the principles of an alternative embodiment of the present invention.
Figure 21:
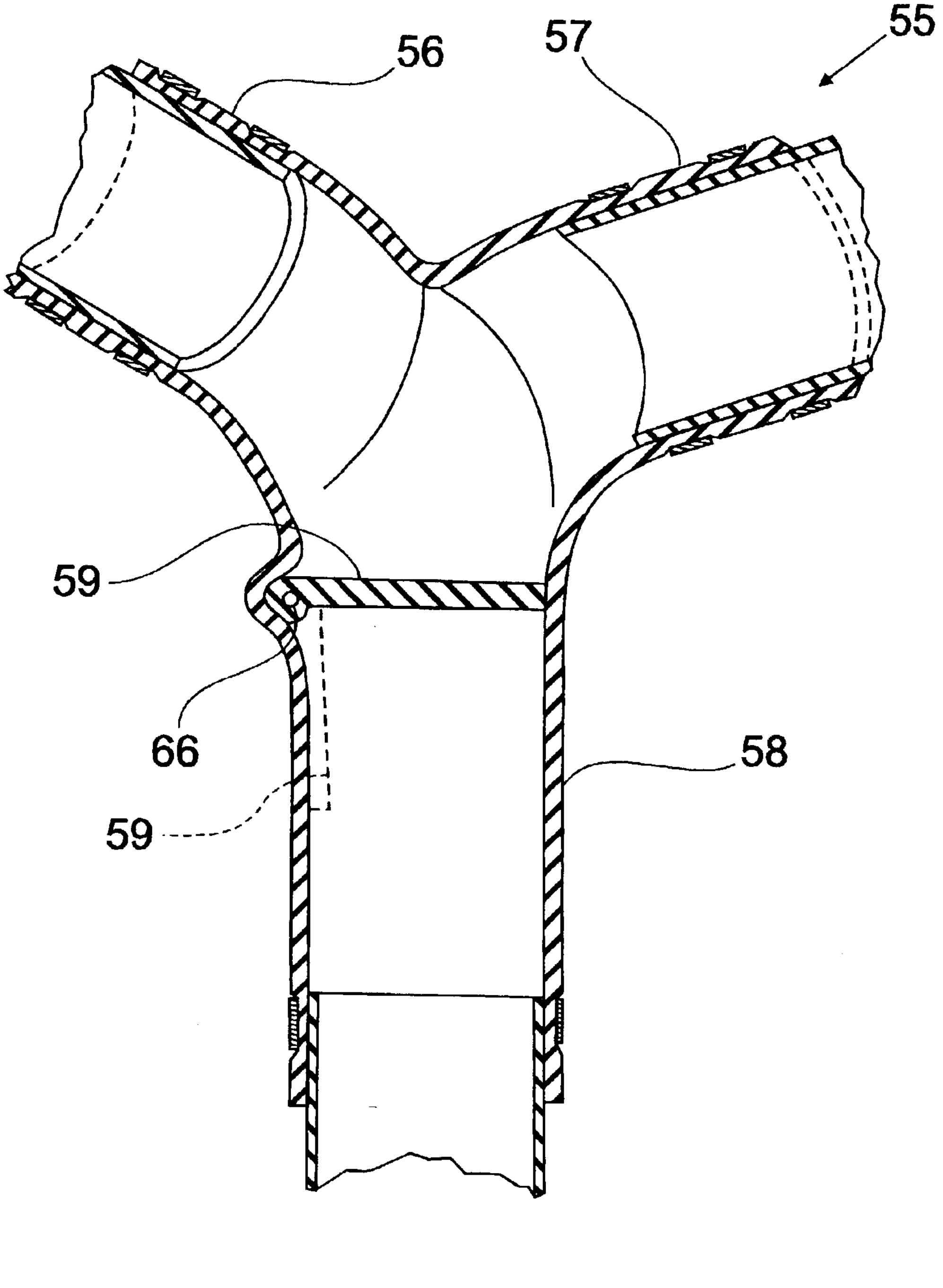
FIG. 21 is an enlarged perspective view of a nurse system receiver header assembly for use in the series nurse system shown in FIG. 19.

Referring now to FIGS. 19–21, an alternative embodiment of the present invention for use in a series planting system can best be seen. In a series planting system, as shown in FIGS. 19–20, a single primary line 50 directs seed to an entire row of receiver headers 55. The headers are formed of a first leg 56 and a second leg 57 in fluid communication with an outlet line 58. When narrow row spacing is desired, a baffle 59 located at the interface of legs 56 and 57 and outlet line 58 is in an open configuration where the baffle 59 is positioned by an external lever (not shown) to a position parallel with the outlet line 58 (shown in phantom). The baffle is pivotable about pivot point 66. In this open configuration, seed flows from the hopper 51 through the primary line 50 to headers 55, where a portion of the seeds flowing through line 50 is diverted through outlet line 58 and into storage bins 53. Seeds flow into the bins 53 until all the bins 53 are filled with seed. When all of the bins 53 are filled with seed, the operator is able to start planting on a narrow row spacing.

On the other hand, if an operator wishes to utilize the parallel system illustrated in FIGS. 19 and 20 to plant in wide rows, he simply shuts off the desired headers 55 by actuating the baffle 59 located in outlet line 58 such as by the external lever (not shown) to close off outlet line 58. Air and entrained seed is therefore not permitted to flow down the closed outlet line 58, and will continue down the primary line 50 to the next header 55.

As described above with respect to the parallel distribution systems, the lever indicates the position of rotatable baffle 59 in the header 55. As a result, the operator can quickly determine the baffle position for the appropriate placement of product into the field (i.e., narrow or wide rows), or quickly change from a narrow seed placement to a wide seed placement and vice versa.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In an agricultural planting implement having a frame adapted for movement over the ground, a hopper supported on said frame for carrying a supply of seed, said hopper having a lower portion including a discharge opening through which seed particles pass to exit said hopper; a flow mechanism for creating a flow of air through a conduit; and a remote planting mechanism engageable with the ground for the planting of seeds therein, the improvement comprising:

a nurse mechanism supported on said hopper to communicate with said discharge opening and said conduit to receive seeds from said hopper and intercept the flow of air coming from said flow mechanism and create an air stream through said nurse mechanism, said nurse mechanism entraining seeds with said air stream for conveyance through a discharge tube in flow communication with said nurse mechanism;

a receiver at said planting mechanism in flow communication with said discharge tube to receive seeds entrained in said air stream, said receiver accumulating a supply of seeds for utilization by said planting mechanism;

a receiver header operatively coupled with said discharge tube and said receiver to direct seeds entrained in said air stream toward said receiver; and at least one movable baffle disposed internally of said receiver header and having first and second outlets associated with first and second singulation meters, the baffle being selectively movable between an open position directing seed delivery through said first and second outlets and a second position blocking seed delivery from at least one of said outlets.

2. The planting implement of claim 1, wherein the receiver header has a plurality of legs in fluid communication with an inlet line.

3. The planting implement of claim 2, further comprising an external lever connected to said baffle, said external lever being movable to effect movement of said baffle and place said header into an open configuration in which said one leg is not blocked by said baffle and into a closed configuration in which said one leg of said header is blocked by said baffle.

4. The planting implement of claim 3, wherein said baffle is located at an uppermost position in said one leg of said header so that substantially all of said one leg is blocked when said baffle is orientated in said closed configuration.

5. The planting implement of claim 4, wherein in said open configuration, said baffle is positioned by said external lever such that it is parallel to said one leg of said header so that said air stream and said entrained seeds can flow through said one leg.

6. The planting implement of claim 4, wherein in said closed configuration, said baffle is positioned by said external lever such that it crosses said one leg of said header so that said air stream and said entrained seeds are prohibited from flowing through said one leg.

7. The planting implement of claim 4, wherein said external lever indicates the selected position of said movable baffle.

8. A planting implement comprising:

a mobile frame adapted for movement over the ground;

a mechanism for creating and channeling a stream of air through a conduit;

a hopper for carrying a supply of product to be dispensed to the ground, said hopper having a discharge opening for the passage of said product;

a planting mechanism engageable with the ground for planting product therein;

a nurse mechanism supported on said hopper to communicate with said discharge opening and said conduit to receive product from said hopper and intercept the flow of air coming from said mechanism for creating an air stream through said nurse mechanism, said nurse mechanism entraining product within said air stream for conveyance through a discharge tub in flow communication with said nurse mechanism;

a plurality of receivers at said planting mechanism in flow communication with said discharge tube to receive product entrained in said air stream, each said receiver accumulating a supply of product for utilization by said planting mechanism; and a selectively moveable blocking mechanism having a first and second outlet associated with a first and second of said receivers and being movable between an open position to direct product to flow through said first and second outlets and a blocking position to block the delivery of said product from at least one of said outlets.

9. The planting implement of claim 8, wherein said blocking mechanism is operable to block a plurality said receivers simultaneously.

10. The planting implement of claim 8, wherein said blocking mechanism includes a movable baffle positioned internally within said at least one receiver and being movable between said open position and said blocking position.

11. The planting implement of claim 10, further comprising:

a receiver header operatively coupled with said discharge tube and at least two of said receivers to direct product entrained in said air stream toward said receivers, said receiver header having a leg corresponding to each said receiver and being in flow communication with said discharge tube, said baffle being operatively supported in at least one of said legs.

12. The planting implement of claim 11, further comprising:

an external lever operatively coupled to said baffle to effect movement thereof, said external lever being indicative of the selected position of said baffle.

13. The planting implement of claim 12, wherein said baffle is selectively positionable by said external lever into said open position in which said baffle is oriented generally parallel to the corresponding said leg of said header so that said air stream and said entrained product can flow through said corresponding leg, and into said blocking position in which said baffle is oriented across said corresponding leg of said header to prohibit said air stream and said entrained product from flowing through said corresponding leg.

14. The planting implement of claim 13, wherein said external lever and said baffle are pivotally mounted on said receiver header.

15. The planting implement of claim 14, wherein said baffle is positioned at an uppermost portion of said corresponding leg to be effective to block substantially the entirety of said corresponding leg.

16. In a planting implement having a frame adapted for movement over the ground, a hopper supported on said frame for carrying a supply of seed, said hopper having a lower portion including a discharge opening through which seed particles pass to exit said hopper; a mechanism for creating a flow of air through a conduit; and a remote planting mechanism engageable with the ground for the planting of seeds therein, the improvement comprising:

a nurse mechanism supported on said hopper to communicate with said discharge opening and said conduit to receive seeds from said hopper and intercept the flow of air coming from said mechanism for creating an air stream through said nurse mechanism, said nurse mechanism entraining seeds within said air stream for conveyance through a primary line in flow communication with said nurse mechanism;

a plurality of receiver headers operatively coupled to a plurality of storage bins, said receiver headers each having a plurality of legs in fluid communication with an outlet line associated with each respective storage bin, each receiver header being further coupled to the primary line and having an air vent that limits a flow rate of said air stream through the header depending on a volume of amassed seeds; and a movable baffle positioned internally of each of said receiver headers and located at the interface of at least one of said legs and the corresponding said outlet line such that said corresponding outlet line can be blocked by said baffle to prevent the flow of said air stream and said entrained seeds into said corresponding outlet line.

17. The planting implement of claim 16, further comprising an external lever operatively connected to said baffle to effect movement of said baffle, said external lever being selectively movable to position said baffle and place said corresponding outlet line into an open configuration in which said corresponding outlet line is not obstructed by said baffle and into a closed configuration in which said corresponding outlet line is blocked by said baffle.

18. The planting implement of claim 17, wherein said external lever and said baffle are pivotally mounted on said receiver header.

19. The planting implement of claim 18, wherein each of said legs on each said receiver header is provided with a baffle and an external lever.

20. The planting implement of claim 19, wherein each said baffle is movable independently of the remaining said baffles.

21. The planting implement of claim 18, wherein each said external lever is movable into a position that is indicative of the position of the corresponding baffle and, thus, indicative of the corresponding outlet line being in said open or said closed configuration.

22. The planting implement of claim 16, wherein said baffle is movable between a first position that directs the flow of said air stream and said entrained seeds to an adjacent pair of the plurality of legs, and a second position that selectively blocks the flow of said air stream and said entrained seeds to at least one of said pair of legs.

* * * * *